2,948,745
// Patented Aug. 9, 1960

United States Patent Office 2,948,745

TREATMENT OF SYNTHETIC NAPHTHA

Michael D. Riordan and Marc F. Fontaine, Fishkill, and Jack Ryer, South Wappingers Falls, N.Y., assignors to Texaco Inc., a corporation of Delaware No Drawing. Filed Jan. 16, 1958, Ser. No. 709,166

8 Claims. (Cl. 260—450)

This invention relates to a process for the treatment of a synthetic naphtha fraction. More particularly, it relates to the treatment of a synthetic naphtha to improve its properties as a motor fuel. In its more specific aspects it relates to the catalytic treatment of a naphtha synthesized from carbon monoxide and hydrogen to produce a gasoline of reduced oxygenated compound content and improved octane number.

The catalytic synthesis of hydrocarbons from hydrogen and carbon monoxide is well known. In this synthesis process a mixture of hydrogen and carbon monoxide is passed over a catalyst such as iron, cobalt or nickel containing a minor amount of an alkaline promoter such as potassium oxide. By controlling the reaction conditions the process can be regulated to yield optimum amounts of hydrocarbons in the $C_5$–$C_{12}$ range. Of this product, a large percentage, generally about 90% is hydrocarbon, the balance of the product being made up of a variety of oxygen-containing compounds such as alcohols, ketones, aldehydes, carboxylic acids and esters.

The presence of many of these oxygen-containing compounds is undesirable in a fraction which is destined for use as a motor fuel. Not only do many of these oxygen-containing compounds have low octane numbers but in addition they impart other undesirable characteristics to the mixture. Hydrocarbon mixtures containing oxygenated compounds are generally unsatisfactory as motor fuels because in some instances they are corrosive in nature, because of their gum forming tendency, and because they impart offensive odor and poor color to the mixture. We have now discovered a process for the conversion of a synthetic naphtha to a motor fuel of high octane number and essentially free of oxygenated compounds.

According to the process of the invention the synthetic naphtha is contacted with a zinc oxide-zinc chromite catalyst at elevated temperatures and is thereby converted to a motor fuel of improved octane number and reduced oxygenated compound content.

In the production of synthetic naphtha, a mixture of hydrogen and carbon monoxide containing between about 1 and 2 parts of hydrogen per part of carbon monoxide by volume is contacted with a powdered iron catalyst promoted with a minor amount of potassium calculated as potassium oxide. The catalyst may be prepared by the reduction of an oxide of iron which is then charged to the reactor or the iron oxide may be charged to the reactor and reduced in situ either with hydrogen or with the synthesis gas itself. The reduced iron powder generally contains from about 0.05 to about 2% potassium calculated as potassium oxide. The synthesis reaction is conducted at temperatures ranging from about 550 to about 750° F. and at pressures ranging from about 100 to about 500 p.s.i.g. The space velocity, that is the volumes of feed per volume of catalyst per hour may range from 500 to 5000 v./v./hr. The effluent from the reactor is cooled to condense the liquid product. The uncondensed gasses are recycled to the reactor and the condensed liquid settles into 2 phases, an upper oil phase and a lower water phase. Since a large proportion of the oxygenated compounds are water soluble they are found to a great extent in the water phase. However, a minor amount of the oxygenated compounds are oil soluble and are to be found in the oil phase, usually amounting to about 10% of the oil phase.

The oil phase is separated from the aqueous phase and is fractionated to produce a synthetic naphtha boiling up to about 400° F. This fraction, although boiling in the motor fuel range and being constituted of about 90% hydrocarbons, is unsatisfactory for use as a motor fuel for the reasons already set forth above. In accordance with the process of the present invention, this fraction can be converted to a high quality motor fuel by treating the synthetic naphtha fraction with a zinc oxide-zinc chromite catalyst at elevated temperatures.

The catalyst used in the process of the present invention contains two components, namely, zinc oxide and zinc chromite, the zinc oxide being present in amounts ranging from 10 to 90% based on the combined weights of the zinc oxide and zinc chromite. The zinc oxide-zinc chromite catalyst may be used alone or may be deposited on a substantially inert base such as alumina or magnesia. Catalysts containing 25 to 75% zinc oxide based on the combined weights of the zinc oxide and zinc chromite are preferred.

The catalyst may be prepared according to the following method in which parts are given by weight. A first solution is prepared by dissolving 3.036 parts of C.P. ammonium dichromate in 10 parts of water and adding 2.4 parts of concentrated ammonium hydroxide in 4 parts of water. A second solution is prepared by dissolving 7.134 parts of C.P. $Zn(NO_3)_2 \cdot 6H_2O$ in 16 parts of water. The first and second solutions are then mixed by being added slowly and simultaneously at equal rates with good agitation to a vessel containing 4 parts of water. Stirring is continued for ½ hour after the addition is complete and then 6 parts concentrated ammonium hydroxide is added to insure complete precipitation.

The precipitate is filtered and washed three times with 10 parts of water, dried and the dried powder decomposed in small portions by heating to incipient decomposition temperature. The decomposition temperature was found to be about 640° F. The decomposed powder is then sieved through 20 mesh, pelleted in 5/32 inch dies with 2% Sterotex (a hydrogenated vegetable fat) and calcined at 750° F. for 12 hours. 2.85 parts of dark brown pellets are obtained.

The resultant catalyst contains 26% zinc oxide and 74% zinc chromite by weight. The composition of the catalyst may be varied using appropriate amounts of ammonium dichromate and zinc nitrate as the starting materials.

When the catalyst is intended for use in a fluidized system the decomposed powder is ground to a particle size of less than 200 microns in diameter with a major proportion between 20 and 80 microns.

The naphtha upgrading reaction is carried out at a temperature between about 800 and 1400° F., preferably between about 900 and 1100° F. Pressures ranging up to 1000 p.s.i.g. may be used. However, a preferred range is from atmospheric to about 600 p.s.i.g. If it is desired to operate the process at higher pressures it will be found that correspondingly higher temperatures should be used to obtain the same amount of conversion. The liquid hourly space velocity, that is the volume of feed per volume of catalyst per hour may vary from 0.1–5 v./v./hr., a preferred range being from 0.2–2 v./v./hr. When hydrogen is added to the reaction to reduce the formation of coke on the catalyst the reaction is then conducted under pressure and correspondingly should be run at higher temperature as pointed out above.

In a specific embodiment of the invention a mixture of carbon monoxide and hydrogen produced by the partial combustion of natural gas and containing approximately 1.8 parts of hydrogen per part of carbon monoxide by volume is contacted with an iron catalyst promoted with 0.5% potassium calculated as potassium oxide, at a temperature of 600° F., a pressure of 400 p.s.i.g. and a space velocity of 1000 v./v./hr. The effluent from the reactor is cooled and the condensed liquid products are separated into an oil phase and an aqueous phase. The oil phase is fractionated to yield a naphtha fraction having a boiling range up to 400° F. The naphtha fraction which contains roughly about 10% oxygenated compounds is then passed over a fixed bed of zinc oxide-zinc chromite catalyst containing 26% zinc oxide and 74% zinc chromite at a temperature of 1000° F., atmospheric pressure and a space velocity of 0.2 v./v./hr. The liquid product boiling in the motor fuel range has a greatly improved octane number and is essentially free of oxygenated compounds. The product gas which contains hydrogen and carbon monoxide in the approximate volumetric ratio of 3:1 may be recycled to the hydrocarbon synthesis reactor.

The following examples which show the upgrading of synthetic naphtha fractions are given for illustrative purposes only:

EXAMPLE I

*Feed stock*

Composition:
- Olefins _____percent__ 76
- Saturates _____do____ 12
- Aromatics _____do____ Less than 1
- Oxygenates _____do____ 11+

ASTM distillation range _____° F__ 220-400

ASTM research octane Nos.:
- Clear _____ 68
- Containing 3 cc. TEL/gal. _____ 72

*Reaction conditions*

Temperature _____° F__ 1000
Space velocity _____v./v./hr__ 0.2
Pressure _____ Atmospheric

*Catalyst composition*

ZnO _____percent__ 5.2
ZnCr₂O₄ _____do____ 14.8
Al₂O₃ _____do____ 80.0

*Liquid product*

Composition:
- Olefins _____percent__ 41
- Saturates _____do____ 23
- Aromatics _____do____ 36

ASTM distillation range _____° F__ 75-502

ASTM research octane No.:
- Containing 3 cc. TEL/gal. _____ ¹ 100.42

*Product gas*

Weight percent basis feed _____ 23.6
Composition:
- Hydrogen _____wt. percent__ 2.6
- Methane _____do____ 16.4
- Ethylene _____do____ 17.3
- Ethane _____do____ 18.5
- Propylene _____do____ 19.2
- Propane _____do____ 7.2
- Butanes _____do____ 1.4
- Butylenes _____do____ 2.2
- C₅ _____do____ 2.6
- CO _____do____ 12.6

¹ Wiese Scale.

EXAMPLE II

*Feed stock*

Composition:
- Olefins _____percent__ 78
- Saturates _____do____ 11
- Aromatics _____do____ Less than 1
- Oxygenates _____do____ 10+

ASTM distillation range _____° F__ 200-420

ASTM research octane Nos.:
- Clear _____ 69
- Containing 3 cc. TEL/gal. _____ 72.6

*Reaction conditions*

Temperature _____° F__ 1025
Space velocity _____v./v./hr__ 0.2
Pressure _____ Atmospheric

*Catalyst composition*

ZnO _____wt. percent__ 26
ZnCr₂O₄ _____do____ 74

*Liquid product*

Composition:
- Olefins _____percent__ 37
- Saturates _____do____ 24
- Aromatics _____do____ 39

ASTM distillation range _____° F__ 72-515

ASTM research octane No.:
- Containing 3 cc. TEL/gal. _____ ¹ 101.1

*Product gas*

Wt. percent basis feed _____percent__ 25.3
Composition:
- Hydrogen _____wt. percent__ 2.8
- Methane _____do____ 17.0
- Ethylene _____do____ 17.5
- Ethane _____do____ 18.8
- Propylene _____do____ 19.4
- Propane _____do____ 7.3
- Butanes _____do____ 1.4
- Butylenes _____do____ 2.5
- C₅ _____do____ 2.5
- CO _____do____ 10.8

¹ Wiese Scale.

It will be noted from the above that the liquid product contains no discernible amount of oxygenated compounds and that the leaded octane number is in excess of 100. It will also be noted that the concentration of CO in the product gas shows effective deoxygenation of the feed stock.

Obviously many modifications and variations of the invention, as hereinbefore set forth, may be made without departing from the spirit and scope thereof, and therefore only such limitations should be imposed as are indicated in the appended claims.

We claim:

1. A process for the production of a motor fuel of improved quality from a synthetic naphtha produced by the catalytic hydrogenation of carbon monoxide which comprises contacting said synthetic naphtha at a temperature between about 800 and 1400° F. with a catalyst comprising zinc oxide and zinc chromite, the zinc oxide being present in an amount between 25 and 75% by weight based on the combined weights of zinc oxide and zinc chromite.

2. A process for the conversion of a liquid hydrocarbon fraction containing oxygenated compounds and produced by the catalytic hydrogenation of carbon monoxide into a liquid hydrocarbon fraction substantially free of oxygenated compounds, which comprises contacting said liquid hydrocarbon fraction containing oxygenated compounds with a catalyst comprising zinc oxide and zinc chromite at a temperature between about 800 and 1400° F., said catalyst containing between 10 and 90% by weight zinc oxide based on the combined weights of zinc oxide and zinc chromite.

3. A process for the conversion of a synthetic naphtha fraction containing oxygenated compounds and produced by the catalytic hydrogenation of carbon monoxide into a motor fuel of high octane number and substantially free of oxygenated compounds which comprises contacting said naphtha fraction with a catalyst comprising zinc oxide and zinc chromite, containing between 25 and 75% zinc oxide based on the combined weights of zinc oxide and zinc chromite, at a temperature between 900 and 1100° F., at a space velocity of between 0.2 and 2 volumes of feed per volume of catalyst per hour and at substantially atmospheric pressure.

4. A process for the production of a motor fuel of high octane number which comprises passing a mixture of hydrogen and carbon monoxide, said mixture containing between 1 and 2 parts of hydrogen per part of carbon monoxide, by volume, in contact with an iron catalyst containing between 0.05 and 2% potassium calculated as potassium oxide at a temperature between about 550 and 750° F. and a pressure ranging from 100 to 500 p.s.i.g., separating the effluent into a gaseous portion and a liquid portion, allowing the liquid portion to settle into an oil phase and an aqueous phase, separating the aqueous phase from the oil phase, fractionating the oil phase to produce a synthetic naphtha fraction boiling up to about 400° F., and passing said synthetic naphtha fraction in contact with a zinc oxide-zinc chromite catalyst containing between about 25 and 75% zinc oxide based on the combined weights of zinc oxide and zinc chromite at a temperature between about 900 and 1100° F., a pressure between about 0 and 600 p.s.i.g. and a space velocity between 0.1 and 5 v./v./hr.

5. A process for the production of a motor fuel of high octane number which comprises passing a mixture of hydrogen and carbon monoxide, said mixture containing between about 1 and 2 parts of hydrogen per part of carbon monoxide by volume, in contact with an iron catalyst containing between 0.05 and 2% potassium calculated as potassium oxide at a temperature between about 550 and 750° F. and a pressure ranging from 100 to 500 p.s.i.g., in a hydrocarbon synthesis reaction zone, separating the effluent into a gaseous portion and a liquid portion, allowing the liquid portion to settle into an oil phase and an aqueous phase, separating the aqueous phase from the oil phase, fractionating the oil phase to produce a synthetic naphtha fraction boiling up to about 400° F., passing said synthetic naphtha fraction in contact with a zinc oxide-zinc chromite catalyst containing between about 25 and 75% zinc oxide based on the combined weights of zinc oxide and zinc chromite at a temperature between about 900 and 1100° F., a pressure between about 0 and 600 p.s.i.g. and a space velocity between 0.1 and 5 v./v./hr., separating the reaction product into a gaseous portion and a liquid portion of high octane number and essentially free of oxygenated compounds and returning the gaseous portion to the hydrocarbon synthesis reaction zone.

6. A process for the production of a motor fuel of improved quality from a synthetic naphtha produced by the catalytic hydrogenation of carbon monoxide which comprises contacting said naphtha under aromatizing conditions with a catalyst comprising zinc oxide and zinc chromite, the zinc oxide being present in an amount between 10 and 90% by weight based on the combined weights of zinc oxide and zinc chromite.

7. The process of claim 6 in which the zinc oxide-zinc chromite catalyst is supported on a substantially inert base.

8. A process for the production of a motor fuel of improved quality from a synthetic naphtha produced by the catalytic hydrogenation of carbon monoxide which comprises contacting said naphtha at a temperature between about 800 and 1400° F. with a catalyst comprising zinc oxide and zinc chromite, the zinc oxide being present in an amount between 10 and 90% by weight based on the combined weights of zinc oxide and zinc chromite.

References Cited in the file of this patent

UNITED STATES PATENTS

| 2,066,153 | Lazier | Dec. 29, 1936 |
| 2,209,458 | Heard et al. | July 30, 1940 |
| 2,651,654 | Hill | Sept. 8, 1953 |
| 2,733,282 | Drews et al. | Jan. 31, 1956 |